United States Patent [19]

Ogasawara

[11] Patent Number: 5,574,535
[45] Date of Patent: Nov. 12, 1996

[54] AUTO-FOCUSING DEVICE

[75] Inventor: Akira Ogasawara, Kawasaki, Japan

[73] Assignee: Nikon Corporation, Tokyo, Japan

[21] Appl. No.: 546,731

[22] Filed: Oct. 23, 1995

Related U.S. Application Data

[63] Continuation of Ser. No. 220,396, Mar. 30, 1994, abandoned, which is a continuation of Ser. No. 101,038, Aug. 3, 1993, abandoned, which is a division of Ser. No. 894,437, Jun. 5, 1992, Pat. No. 5,270,763.

[30] Foreign Application Priority Data

Jun. 24, 1991 [JP] Japan ..................... 3-178780

[51] Int. Cl.$^6$ .................................. G03B 13/36
[52] U.S. Cl. ............................. 396/95; 396/96
[58] Field of Search ................... 354/402, 400, 354/406, 407, 408; 250/201.2, 201.7, 201.8

[56] References Cited

U.S. PATENT DOCUMENTS 4,783,677  11/1988  Hamada et al. ............... 354/402
5,179,407   1/1993  Kusaka et al. ................ 354/400

Primary Examiner—W. B. Perkey
Attorney, Agent, or Firm—Shapiro and Shapiro

[57] ABSTRACT

An auto-focusing device for stably driving a photographing lens to track a moving object comprises a charge accumulation type photo-electric conversion device for accumulating charges at a predetermined time interval to produce a focus detection signal, a defocus amount calculation device for calculating a defocus amount of the photographing lens based on the focus detection signal, a drive distance calculation device for calculating a direction and a distance of the lens drive for driving the photographing lens to track the moving object based on at least the defocus amount, a drive device for driving the photographing lens in accordance with the calculated direction and distance of the lens drive, and a control device for supplying the direction and distance of the lens drive calculated by the drive distance calculation device to the drive device after the end of the next charge accumulation by the photo-electric conversion device to drive the photographing lens so that the photographing lens tracks the moving object.

6 Claims, 10 Drawing Sheets

AUTO-FOCUSING DEVICE

This is a continuation of application Ser. No. 08/220,396 filed Mar. 30, 1994 (now abandoned), which is a continuation of application Ser. No. 08/101,038 filed Aug. 3, 1993 (abandoned), which is a division of application Ser. No. 07/894,437 field Jun. 5, 1992 (now U.S. Pat. No. 5,270,763).

BACKGROUND OF THE INVENTION

1. Field of the Invention

The present invention relates to an auto-focusing device of a camera, and more particularly to a tracking-drive of a photographing lens to always keep the photographing lens in focus to a moving object.

2. Related Background Art

An auto-focusing device having a so-called overlapped servo function which servos a photographing lens into an in-focus position (hereinafter referred to as an AF servo) during a charge accumulation period of a charge accumulation type photo-electric conversion element (hereinafter referred to as an AF sensor) to enhance the tracking ability to a moving object has been known. (For example, Japanese Laid-Open Patent Application No. 2-146010).

The assignee of the present invention has proposed in (Japanese Patent Application No. 2-256677) an auto-focusing device having a so-called overlap prediction drive function which detects the movement of an object while conducting overlapped servo and predicts a position of the object to drive a photographing lens.

FIG. 11 illustrates the overlap prediction drive method. An abscissa represents a time t and an ordinate represents a distance Z on an optical axis. A curve Q represents a distance on the optical axis between the photographing lens and a focusing position of the object and it varies as the object moves. On the other hand, a curve L represents a distance on the optical axis between the photographing lens and a film plane. Accordingly, a difference between Q and L represents a defocus amount D. Times such as t(n) and t(n−1) are substantially center times of accumulation times of the charge accumulation type AF sensor, and time periods surrounded by lines parallel to the ordinate Z on the opposite sides of the center times represent charge accumulation times. D(n−1) and D(n) denote defocus amounts at the times t(n−1) and t(n), respectively. Hereinafter, the distance measurement time is represented by the time t(n) although the charge accumulation time for measuring the distance is actually required so long as the charge accumulation type AF sensor is used. In the present specification, the measurement of distance means the charge accumulation of the charge accumulation type AF sensor. In a drawing which illustrates the overlapped servo, the ordinate, the abscissa and the curves Q and L are identical to those of FIG. 11.

As seen from FIG. 11, a displacement P(n) of the focusing plane of the object from the time t(n−1) to the time t(n) is determined from the defocus amount D(n) detected by the measurement of distance at the time t(n), the previous defocus amount D(n−1) and a displacement M(n) of the photographing lens between this period.

$$P(n) = D(n) + M(n) - D(n-1) \quad (1)$$

Accordingly, an image plane velocity S(n) of the object is given by $$S(n) = P(n)/\{t(n) - t(n-1)\} \quad (2)$$

Assuming that the distance measurement period $\{t(n+1) - t(n)\}$ is substantially the same for each time, a displacement of the object from the time t(n) to the next distance measurement time t(n+1) may be predicted as P(n).

A data transfer time of a CCD and a calculation time for the defocus amount are included from the termination of the charge accumulation by the AF sensor to the calculation of the defocus amount. In the overlapped servo, the photographing lens is usually driven even during this period. Thus, when the lens drive distance is to be determined based on the calculated defocus amount, a correction must be made by taking the displacement of the photographing lens during this period into account. Assuming that the end time of calculation of the defocus amount by the distance measurement at the time t(n) is tm(n) and the displacement of the photographing lens from the time t(n) to the time tm(n) is PD(n), a lens drive distance at the time tm(n), that is, a total drive distance V(n) to be servoed such that the defocus amount at the next distance measurement is zero is calculated in the following manner. Namely, the total drive distance V(n) is calculated by adding the defocus amount D(n) measured at the time t(n) to the predicted displacement P(n) of the object from the time t(n) to the next distance measurement time t(n+1), and subtracting therefrom the lens drive distance PD(n) from the time t(n) to the defocus amount calculation end time tm(n).

$$\begin{aligned} V(n) &= D(n) + P(n) - PD(n) \\ &= 2D(n) + M(n) - D(n-1) - PD(n) \end{aligned} \quad (3)$$

If the photographing lens is driven along the curve L1 in accordance with the total drive distance V(n) calculated by the formula (3) during the period from the calculation end time tm(n) to the start of the next distance measurement, the defocus amount D(n+1) at the next measurement distance is substantially zero. However, since the next distance measurement is started soon after the calculation of the defocus amount at the time tm(n), the period from the time tm(n) to the start of the next distance measurement is very short, and it is difficult to drive the photographing lens during that period because of a limit of a motor power. The photographing lens is usually driven along a broken curve L2 and the drive of the lens by the total drive amount V(n) calculated by the formula (3) is not completed by the start of the next distance measurement. As a result, the photographing lens cannot catch up to the moving object even if the control is updated by using the total drive distance V(n) of the formula (3) as a servo target each time the defocus amount is calculated.

In order to solve this problem, in Japanese Patent Application No. 2-256677 mentioned above, the correction amount to be subtracted when the total drive distance V(n) is calculated, that is, the lens displacement PD(n) from the time t(n) to the time tm(n) is ignored, and the total drive distance V(n) calculated by $$\begin{aligned} V(n) &= D(n) + P(n) \\ &= 2D(n) + M(n) - D(n-1) \end{aligned} \quad (4)$$

is servoed. As a result, as shown in a curve L3, the photographing lens is driven in excess of PD(n) from the predicted position of the object at the time t(n+1) so that the photographing lens approaches more closely to the curve Q.

However, the latter auto-focusing device described above includes the following problem.

In the prior art device, since the displacement of the lens during the calculation period of the defocus amount is not taken into account in calculating the lens drive distance, the photographing lens is driven in excess and the photographing lens finally passes the object at a certain distance measurement time. Since the lens drive distance during the calculation period of the defocus amount is not taken into account at the next update of the servo, the photographing lens finally passes the object by a fairly long distance and the total drive distance calculated by the formula (4) becomes negative, when the lens drive is first stopped until a normal condition for the photographing lens to follow the object is recovered. As a result, the photographing lens passes the object and stops, and passes the object and stops, and makes an unstable and discontinuous movement.

It is an object of the present invention to provide an auto-focusing device which stably drives a photographing lens to track a moving object.

One aspect of the present invention as shown in FIG. 1A relates to an auto-focusing device that comprises charge accumulation type photo-electric conversion means 101 for accumulating charges at a predetermined time interval in accordance with a focus detection light beam transmitted through a photographing lens to produce a focus detection signal; defocus amount calculation means 102 for calculating a defocus amount including a deviation between a focus plane of the focus detection light beam transmitted through the photographing lens and an anticipated focus plane and a direction of the deviation based on the focus detection signal after the end of each accumulation of the charge by the photo-electric conversion means 101; drive distance calculation means 103 for calculating a direction and a distance of lens drive for driving the photographing lens to track a moving object based on at least the defocus amount produced by the defocus amount calculation means 102; drive means 104 for driving the photographing lens in accordance with the direction and the distance of the lens drive calculated by the drive distance calculation means 103.

It further comprises control means 105 for supplying the direction and the distance of the lens drive calculated by the drive distance calculation means 103 to the drive means 104 after the end of the next charge accumulation by the photo-electric conversion means 101 to drive the photographing lens.

The control means 105 supplies the direction and distance of the lens drive calculated by the drive distance calculation means 103 to the drive means after the end of the next charge accumulation by the photo-electric conversion means 101 to drive the photographing lens.

In accordance with this aspect, the direction and distance of the lens drive to drive the photographing lens to track the moving object are calculated based on at least the defocus amount calculated after the charge accumulation, and the photographing lens is driven after the end of the next charge accumulation in accordance with the calculated direction and distance of the lens drive. Accordingly, the photographing lens can stably track the moving object and the tracking ability is improved.

Another aspect of the present invention comprises drive distance calculation means 103A for calculating the direction and the distance of the lens drive for making the photographing lens in focus at the (N+2)th charge accumulation based on the defocus amount calculated at the end of the at least N-th charge accumulation by said photo-electric conversion means 101. The drive distance calculation means 103A calculates the direction and distance of the lens drive for making the photographing lens in focus at the (N+2)th charge accumulation based on at least the defocus amount calculated at the end of the N-th charge accumulation of the photo-electric conversion means 101.

In accordance with the second aspect, the direction and distance of the lens drive for making the photographing lens in focus at the (N+2)th charge accumulation are calculated based on at least the defocus amount calculated at the end of the N-th charge accumulation. Accordingly, the photographing lens may be driven over a relatively long period from the end of the (N+1)th charge accumulation to the start of the (N+2)th charge accumulation, and the tracking ability is improved as it is in the first aspect.

A third aspect of the present invention comprises drive distance calculation means 103B for calculating the direction and the distance of the lens drive by predicting a displacement of the object during a release delay time from the release of a shutter to the light exposure to a film. The drive distance calculation means 103B calculates the direction and distance of the lens drive by predicting the displacement of the object during the release delay time from the shutter release to the light exposure to the film.

In accordance with the third aspect, the direction and distance of the lens drive are calculated by predicting the displacement of the object during the release delay period from the shutter release to the light exposure to the film. Accordingly, the photographing lens can be brought to an exact in focus position at the time of exposure for a fast moving object.

A fourth aspect of the present invention comprises drive distance calculation means 103C for calculating the direction and the distance of the lens drive by correcting a portion of the predicted displacement of the object during the release delay period. The drive distance calculation means 103C calculates the direction and distance of the lens drive by correcting a portion of the predicted displacement of the object during the release delay period.

In accordance with the fourth aspect, the direction and distance of the lens drive are calculated by correcting a portion of the predicted displacement of the object during the release delay period. Accordingly, a similar effect to that of the third aspect is attained.

A fifth aspect of the present invention comprises control means 105A which does not output current direction and distance of the lens drive to the drive means 104 when the current direction of the lens drive calculated by the drive distance calculation means 103–103C is different from the previous direction of the lens drive. The control means 105A does not output the current direction and distance of the lens drive to the drive means 104 when the current direction of the lens drive calculated by the drive distance calculation means 103–103C is different from the previous direction of the lens drive.

In accordance with the fifth aspect, the photographing lens is not driven in accordance with the currently calculated direction and distance of the lens drive when the currently calculated direction of the lens drive is different from the previous direction. Accordingly, the photographing lens is driven smoothly.

A sixth aspect of the present invention as shown in FIG. 1B relates to an auto-focusing device comprising: charge accumulation type photo-electric conversion means 201 for accumulating charges at a predetermined time interval in accordance with a focus detection light beam transmitted through a photographing lens to produce a focus detection signal; defocus amount calculation means 202 for calculating a defocus amount including a deviation between a focus plane of the focus detection light beam by the photographing lens and an anticipated focus plane and a direction of the deviation based on the focus detection signal after the end of each accumulation of the charge by the photo-electric conversion means 201; first drive distance calculation means 203 for calculating a direction and a distance of lens drive to drive the photographing lens to track a moving object based on at least the defocus amount produced by the defocus amount calculation means 202; lens displacement detection means 204 for detecting actual direction and displacement of the photographing lens; drive means 205 for driving the photographing lens and in accordance with the direction and the distance of the lens drive calculated by the first drive distance calculation means 203.

It further comprises displacement accumulation means 206 for accumulating the direction and the displacement of the photographing lens detected by the lens displacement detection means 204; and second drive distance calculation means 207 for adding the accumulation of the direction and the displacement accumulated by the displacement accumulation means to the direction and distance of the lens drive calculated by the first drive distance calculation means 203. The drive means 205 drives the photographing lens in accordance with a lens drive target calculated by the second drive distance calculation means 207.

In accordance with the sixth aspect, the direction and distance of the lens drive to drive the photographing lens to track the moving object are added to the accumulation of the actual direction and displacement of the photographing lens to calculate the lens drive target for driving the photographing lens. Accordingly, the positions of the photographing lens at the respective times may be represented on a common scale, the calculation of the lens drive distance in the auto-focusing control is simplified, and the control response is improved.

A seventh aspect of the present invention comprises lens displacement detection means 204A including an encoder for generating a pulse signal for each predetermined displacement of the photographing lens, displacement accumulation means 206A including a counter for counting pulse signals supplied from the lens displacement detection means 204A to accumulate the direction and the displacement of the photographing lens, and second drive distance calculation means 207A for converting the direction and the distance of the lens drive calculated by the first drive distance calculation means 203 to a number of pulses per predetermined displacement and adding the pulse count counted by the displacement accumulation means 206A to the number of pulses to calculate the lens drive target.

In accordance with the seventh aspect, the direction and displacement of the photographing lens are detected by the encoder and the pulse signals from the encoder are counted to accumulate the actual direction and displacement of the photographing lens, and the direction and distance of the lens drive converted to the number of pulses per predetermined drive distance are added to the accumulated direction and displacement to calculate the lens drive target in order to drive the photographing lens. Accordingly, a similar effect to that of the sixth aspect is attained.

An eighth aspect of the present invention comprises drive means 205A which does not drive the photographing lens in accordance with the current lens drive target when the direction of drive of the current lens drive target calculated by the second drive distance calculation means 207A is different from the direction of drive of the previous lens drive target.

In accordance with the eighth aspect, the photographing lens is not driven in accordance with the currently calculated lens drive target when the direction of drive of the currently calculated lens drive target is different from the direction of drive of the previous lens drive target. Accordingly, the photographing lens is driven smoothly.

DETAILED DESCRIPTION OF THE PREFERRED EMBODIMENTS

Figure 1A:
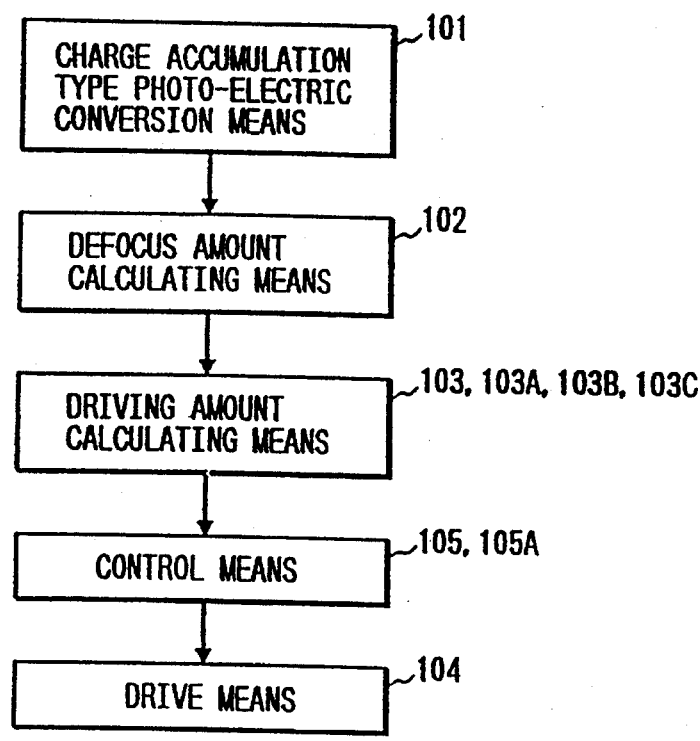
FIGS. 1A and 1B show system diagrams of the present invention.
Figure 1B:
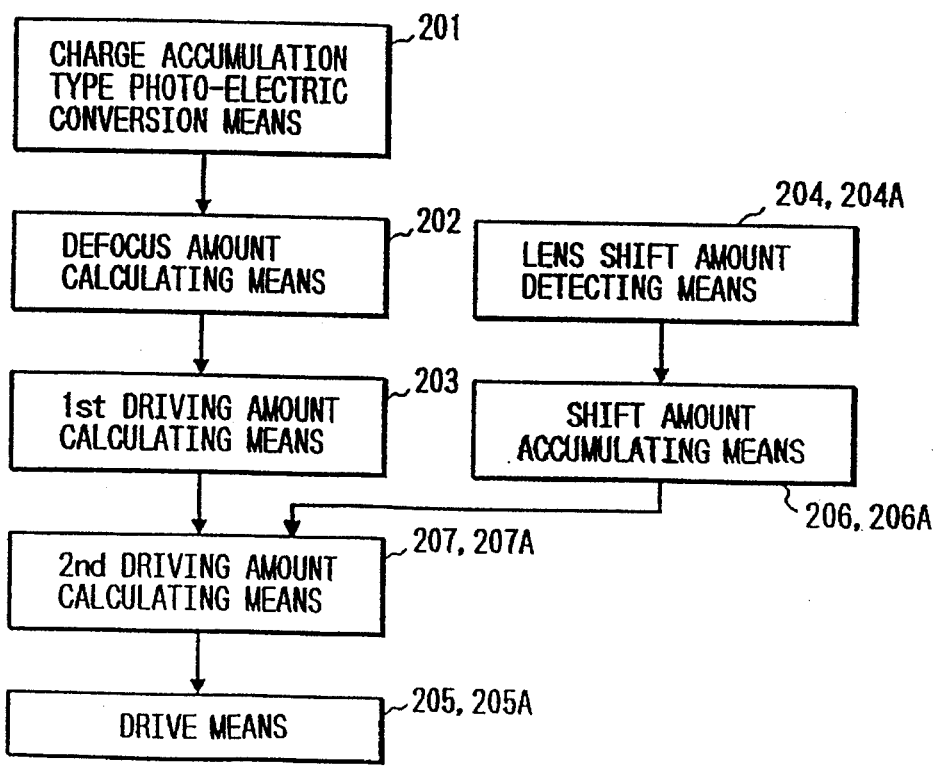
Figure 2:
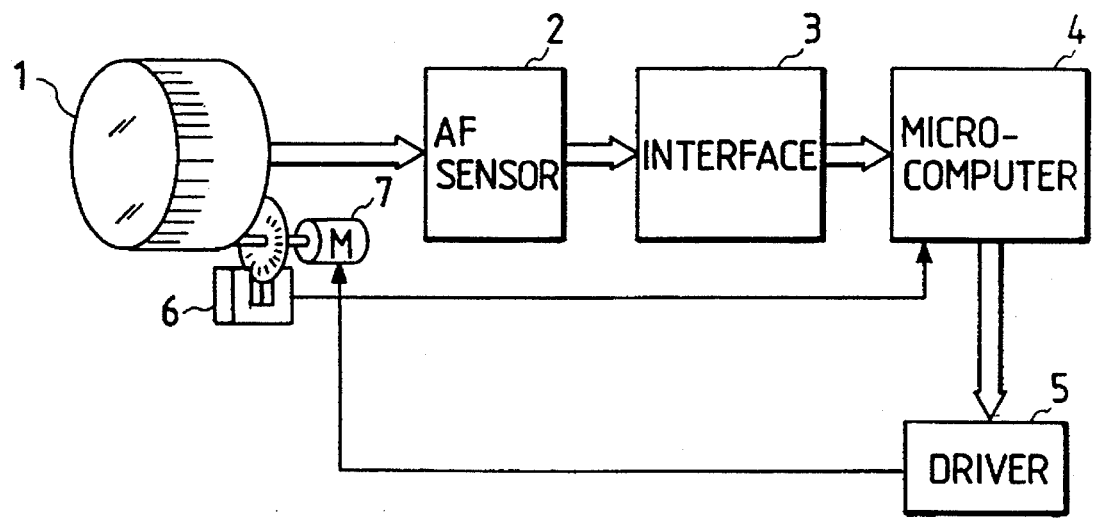
FIG. 2 shows a block diagram of one embodiment.

FIG. 2 shows a block diagram of a configuration of one embodiment.

A focus detection light beam from an object through a photographing lens 1 is focused on an AF sensor 2 such as a CCD arranged in a camera body, and an optical image signal from the AF sensor 2 is sent to a microcomputer (CPU) 4 which controls an overall system, through an interface 3.

An optical image pattern of the focus detection light beam projected onto the AF sensor 2 is A/D converted by the interface 3 and outputted to the CPU 4, or amplified to an appropriate signal level by the interface 3 and A/D converted by an A/D converter built into the CPU 4. The CPU 4 processes the optical image pattern converted to the digital signal, by a predetermined algorithm to calculate a defocus amount, and calculates a lens drive distance to make the photographing lens 1 in focus based on the defocus amount. An optical principle to detect the defocus amount and an algorithm thereof are known and the description thereof is omitted.

The photographing lens 1 is provided with an encoder 6 for monitoring a displacement thereof, and the encoder 6 generates a pulse each time the photographing lens 1 is moved by a predetermined distance along an optical axis. The CPU 4 supplies the calculated lens drive distance to a driver 5 to drive a servo motor 7 to drive the photographing lens 1 toward the in-focus position. The CPU 4 further monitors the displacement of the photographing lens 1 by a feedback pulse from the encoder 6, and when it counts up the feedback pulses by the number determined by the defocus amount, it stops the drive of the servo motor 7. Usually, the encoder 6 comprises a photo-interrupter arranged on a rotary shaft of the servo motor 7 or a portion of reduction gears and detects the rotation of the motor 7 which drives the photographing lens.

Figure 3:
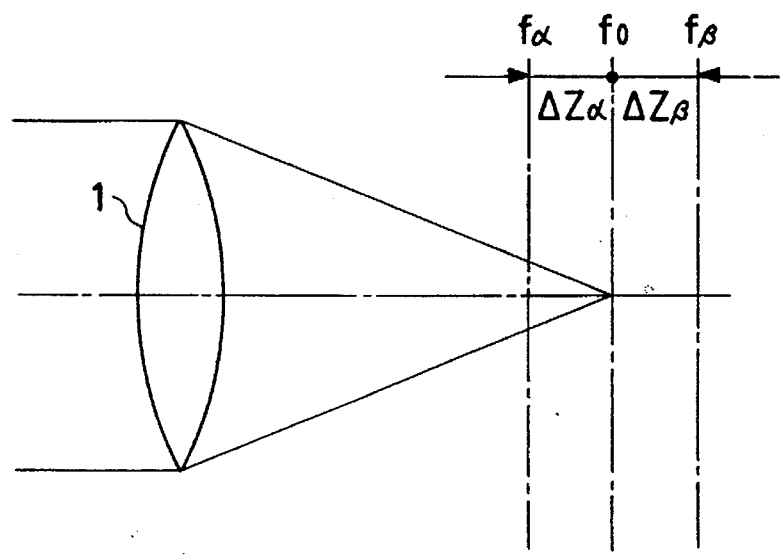
FIG. 3 illustrates a defocus amount.

The defocus amount is defined as a relative image plane displacement $\Delta Z$ between a plane (focusing plane) on which the focus detection light beam transmitted through the imaging lens 1 is focused and a film plane (target focusing plane), and it is substantially equal to the lens drive distance required to make the photographing lens 1 in focus. Accordingly, as shown in FIG. 3 in order to focus (make in focus) the optical image to the film plane, the photographing lens 1 is driven backward by a defocus amount $\Delta Z\alpha$ in a near focus state, and the lens 1 is driven forward by a defocus amount $\Delta Z\beta$ in a far focus state. Strictly speaking, the defocus amount $\Delta Z$ is not equal to the lens drive distance although it is assumed in the present specification that both are equal.

Figure 4:
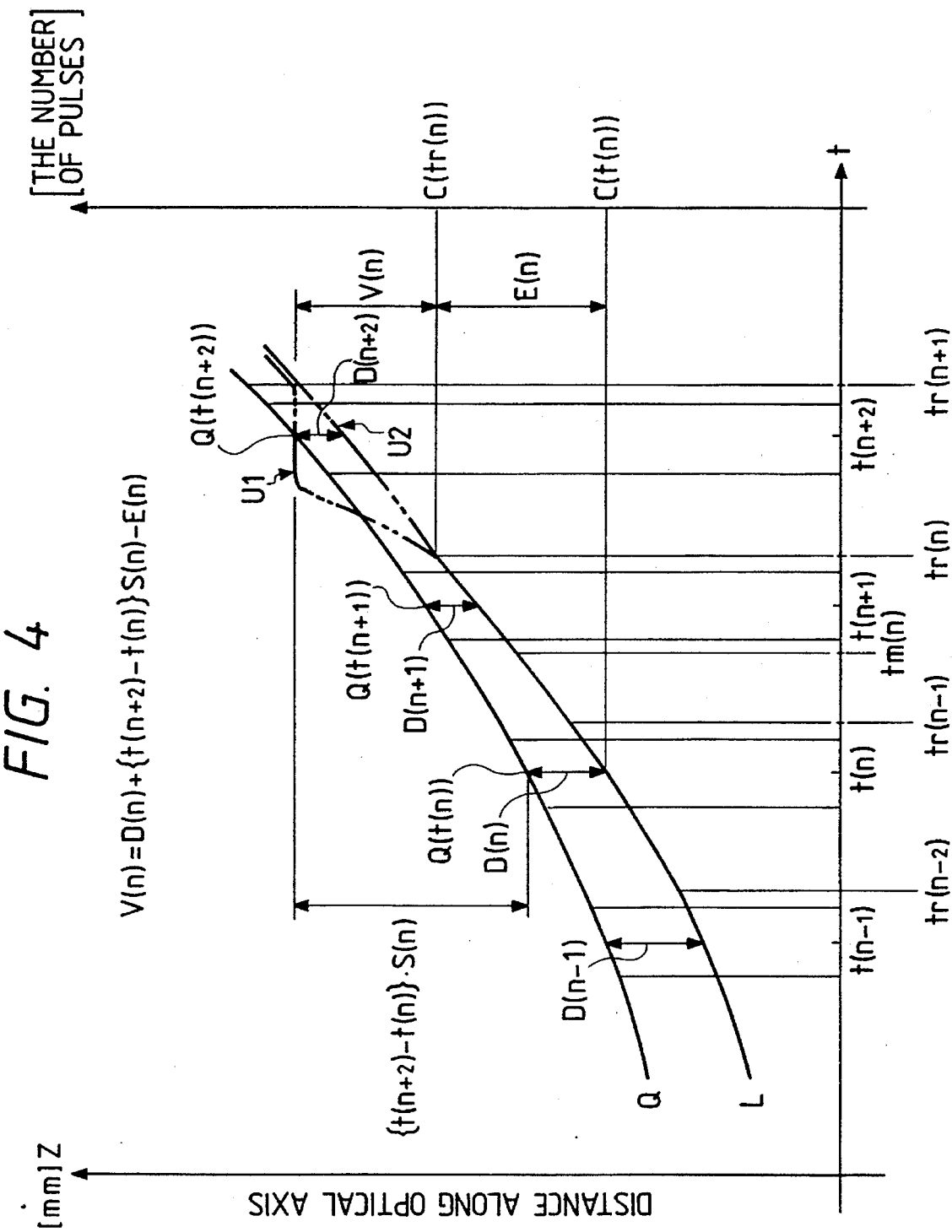
FIG. 4 illustrates a tracking drive method of a photographing lens to a moving object.

FIG. 4 illustrates an overlap prediction drive of the present invention.

Figure 11:
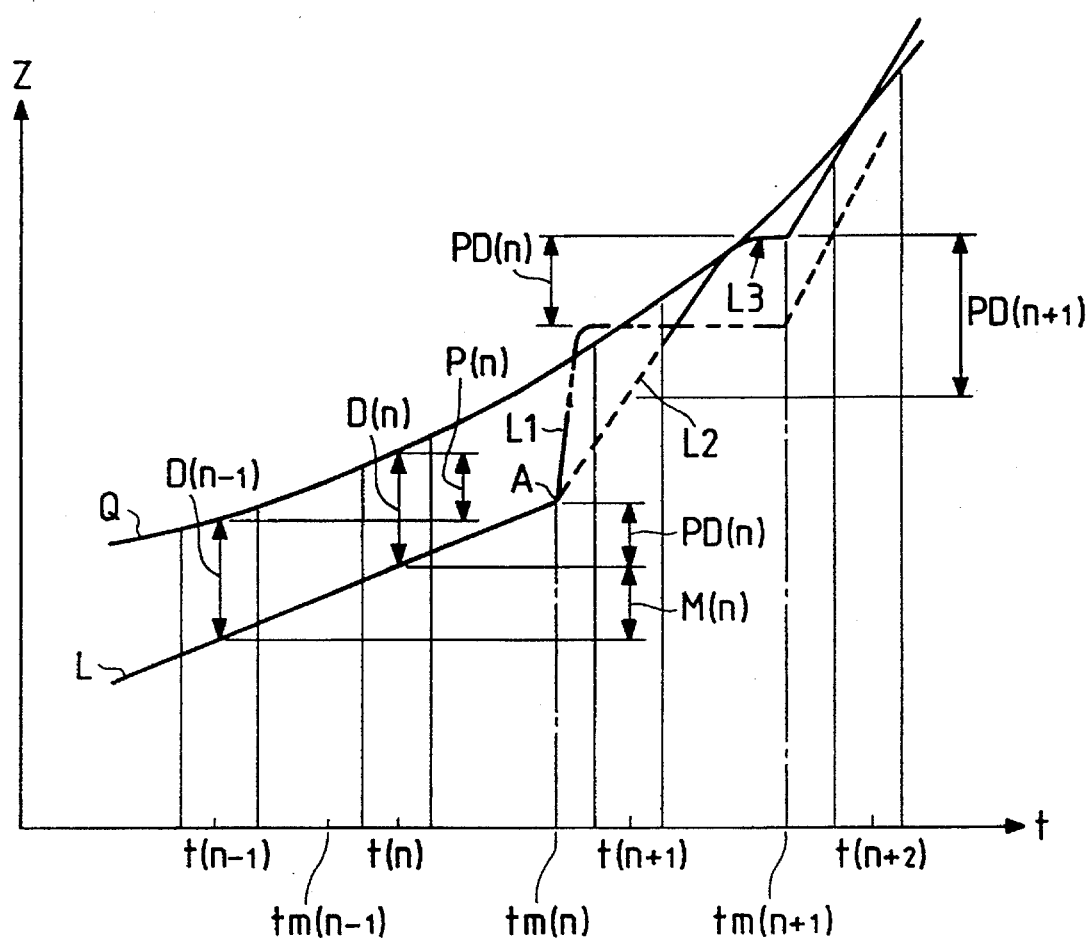
FIG. 11 illustrates a prior art tracking drive method of the photographing lens to the moving object.

Like in the prior art device shown in FIG. 11, the defocus amount D(n) measured at the time t(n) is calculated at the time tm(n). In the present invention, however, the servo is not refreshed at the time tm(n) but the calculated defocus amount D(n) is stored. If the previous servo is being executed, it is continued, and the servo is continued during the distance measurement period at the next measurement time t(n+1). The servo is refreshed at a time tr(n) which is immediately after the end of the measurement at the next measurement time t(n+1). Namely, the refresh of the servo target based on one measurement is withheld until the end of the next measurement.

In the prior art, when the photographing lens 1 is to be driven based on the measurement, a counter which counts up pulse signals from the encoder 6 is usually reset to zero if the counter is of increment type and it is preset if it is of decrement type in order to facilitate the control because the setting of the number of pulses corresponding to the lens drive distance as the reference or the preset count of the counter when the servo is refreshed functions to set the target for the lens drive distance.

In the present embodiment, however, the monitor pulses from the encoder 6 which indicate the lens drive distance are simply accumulated by the counter and the counter is not reset or preset each time the servo is refreshed. This may be done by simply accumulating the monitor pulses from the encoder 6 which indicate the lens drive distance by the counter and not modifying the count each time the servo is refreshed. This method is hereinafter referred to as a linear count method. It is assumed that the control system may read the accumulated lens drive distance any time. Thus, the count of the counter represents the position of the photographing lens 1 on the optical axis and also represents a distance between the photographing lens 1 and the film plane. In FIG. 11, the ordinate represents the distance (mm) between the lens and the film plane or the object. In the linear count method, the ordinate represents the count of the counter, for example, the count C(t(n)) at the time t(n). The image plane displacement (mm) along the optical axis may be calculated by multiplying the number of pulses with a coefficient per pulse of the encoder 1 which is inherent to the photographing lens.

The right ordinate in FIG. 4 represents the positions of the photographing lens 1 and the object as scaled by the number of pulses from the encoder 6.

By initializing the counter such that the count of the counter reaches a predetermined count when the photographing lens 1 is at a predetermined position (for example, the count is zero when the photographing lens 1 is in focus to an infinite object), an absolute distance to the object may be determined from the count of the counter but such a process is not necessary because only the displacement of the photographing optical system, that is, the change in the position of the lens need be measured. In the present invention, the absolute number of pulses is not significant but the fact that a difference between the two counts represents the lens displacement during that period is utilized.

The Japanese Laid-Open Patent Application No. 2-146010 mentioned above discloses a method for calculating a mean measurement position of the measurement system in the overlapped servo. The measurement position is calculated by a relative value to the count. It indicates that the mean lens position in the measurement is counted as a pulse count C(t(n)) and it well matches to the linear count system. Thus, the displacement M(n) of the lens between two measurement times in the formula (1) is given by $$M(n)=f\{C(t(n))-C(t(n-1))\} \qquad (5)$$

where f{ } is a function which converts the number of pulses to the distance (mm). It may be approximated by multiplying a coefficient with {C(t(n))-C(t(n-1))}, as described above. The coefficient is inherent to the photographing lens and differs from lens to lens. The object image plane velocity S(n) given by the formula (2) may be readily determined from the above.

In FIG. 4, even if the defocus amount D(n) at the time t(n) is stored until the end of the measurement at the time t(n+1) and the servo is not refreshed at the time tm(n), the photographing lens 1 is usually driven by the previous servo until the end of the measurement at the time t(n+1). If the count at the servo refresh time tr(n) is C(tr(n)) and the mean measurement position during the measurement at the time t(n) is given by the count C(t(n)), a displacement EC(n) during this period is given by $$EC(n)=C(tr(n))-C(t(n)) \qquad (6)$$

This is the lens displacement as represented by the pulse count, and the displacement E(n) (mm) along the optical axis is given by the conversion function f{ } as follows.

$$E(n)=f\{EC(n)\} \qquad (7)$$

In this manner, the linear count method permits the representation of the lens positions at the respective times by the counts of the counter on the same scale and it is very advantageous. The prior art method in which the count is cleared for each refresh of the servo may be attained by accumulating the lens drive distances calculated from time to time by the microcomputer but it is complex and the linear count method is obviously superior in processing data. However, in the linear count method, when the servo target is set at the time of servo refresh, it is necessary to convert the lens drive distance calculated from the defocus amount to a corresponding number of pulses and add the count of the counter thereto. It is a new target position for the lens drive represented by the count.

The servo target position at the time of servo refresh at the time tr(n) is also an anticipated object position $\theta(t(n+2))$ of the measurement time at the next time t(n+2). This position is determined by adding the object position $\theta(t(n))$ at the measurement time t(n) to the anticipated object displacement P(n) from the time t(n) to the time t(n+2). Namely, the anticipated object displacement P(n) is determined by multiplying the time $\{t(n+2)-t(n)\}$ for the two measurement periods with the object image plane velocity S(n).

$$P(n)=\{t(n+2)-t(n)\}\times S(n) \qquad (8)$$

where $\{t(n+2)-t(n)\}$ is preferably dedicated from the past measurement periods. For example, it may be assumed that $\{t(n+2)-t(n)\}=\{t(n)-t(n-2)\}$.

Since the lens position at the time $t(n)$ is retarded from the object position $Q(n)$ by the defocus amount $D(n)$ and the lens drive distance from the time $t(n)$ to the time $tr(n)$ is determined from the formula (7), a total drive distance $V(n)$ to be driven at the time $tr(n)$ is given by $$V(n)=D(n)+\{t(n+2)-t(n)\}\times S(n)-E(n) \qquad (9)$$

By withholding the servo refresh until the end of the next measurement, the time from it to the start of measurement at the time $t(n+2)$ can be fully used to drive the lens. If the lens is driven over the target lens drive distance during this period, the measured defocus amount $D(n+2)$ at the time $t(n+2)$ is substantially zero as shown by a curve U1. If the lens drive is not completed before the start of the measurement at the time $t(n+2)$, the lens 1 is a little bit behind the object as shown by a curve U2. In this case, the measurement at the time $t(n+2)$ is effected in overlap with the lens drive. The servo may be terminated during the measurement period at the time $t(n+2)$ but, in any case, the servo is refreshed based on the measurement at the time $t(n+1)$ like the previous case, at the time $tr(n+1)$ after the end of the measurement. Accordingly, the photographing lens 1 may substantially stably track the object by this method, and the photographing lens 1 is not substantially behind the object nor does it pass the object so long as the object uniformly moves and the measurement is exactly done.

Actually, however, the photographing lens 1 may pass the object due to a problem such as an irregular movement of the object, an error in the measurement or a problem in the control of the drive of the photographing lens 1. If the pass amount is large, the total drive distance $V(n)$ calculated by the formula (9) at the time of the servo refresh is negative. Namely, there is a possibility that the photographing lens 1 passes the anticipated object position at the time $t(n+2)$. In this case, the drive of the photographing lens 1 in the reverse direction is not effected in view of a possible impact to the uniformity of the lens drive and the mechanical backlash of the lens drive system but the lens drive is stopped or the current servo target is maintained. So long as the object moves in the same direction, the photographing lens 1 will follow the object at the subsequent measurement time and the normal overlapped prediction movement is resumed.

The formula (9) shown above is used to calculate the object image plane velocity $S(n)$ from the past measurement and the displacement of the photographing lens 1, and predict the object position at the time $t(n+2)$ based on it to determine the lens drive distance. Since the time $t(n+2)$ is a future anticipated time when the servo is refreshed at the time $tr(n)$, the following assumption is made in the calculation.

$$\begin{aligned} t(n+2)-t(n) &= 2\times\{t(n+1)-t(n)\} \\ &= 2\times\{t(n)-t(n-1)\} \end{aligned} \qquad (10)$$

Accordingly, from the formulas (1), (2), (9) and (10), the total drive distance $V(n)$ of the photographing lens 1 is given by $$V(n) = D(n) + \{t(n+2)-t(n)\}\times S(n) - E(n) \qquad (11)$$

$$\begin{aligned} &= D(n) + 2\times\{t(n)-t(n-1)\}\times P(n)/\\ &\quad \{t(n)-t(n-1)\} - E(n)\\ &= D(n) + 2\times P(n) - E(n)\\ &= D(n) + 2\times\{D(n)+M(n)-D(n-1)\} - E(n)\\ &= 3D(n) - 2D(n-1) + 2M(n) - E(n) \end{aligned}$$

Since the formula (11) does not include the time nor a division, the calculation is very simple.

Figure 5:
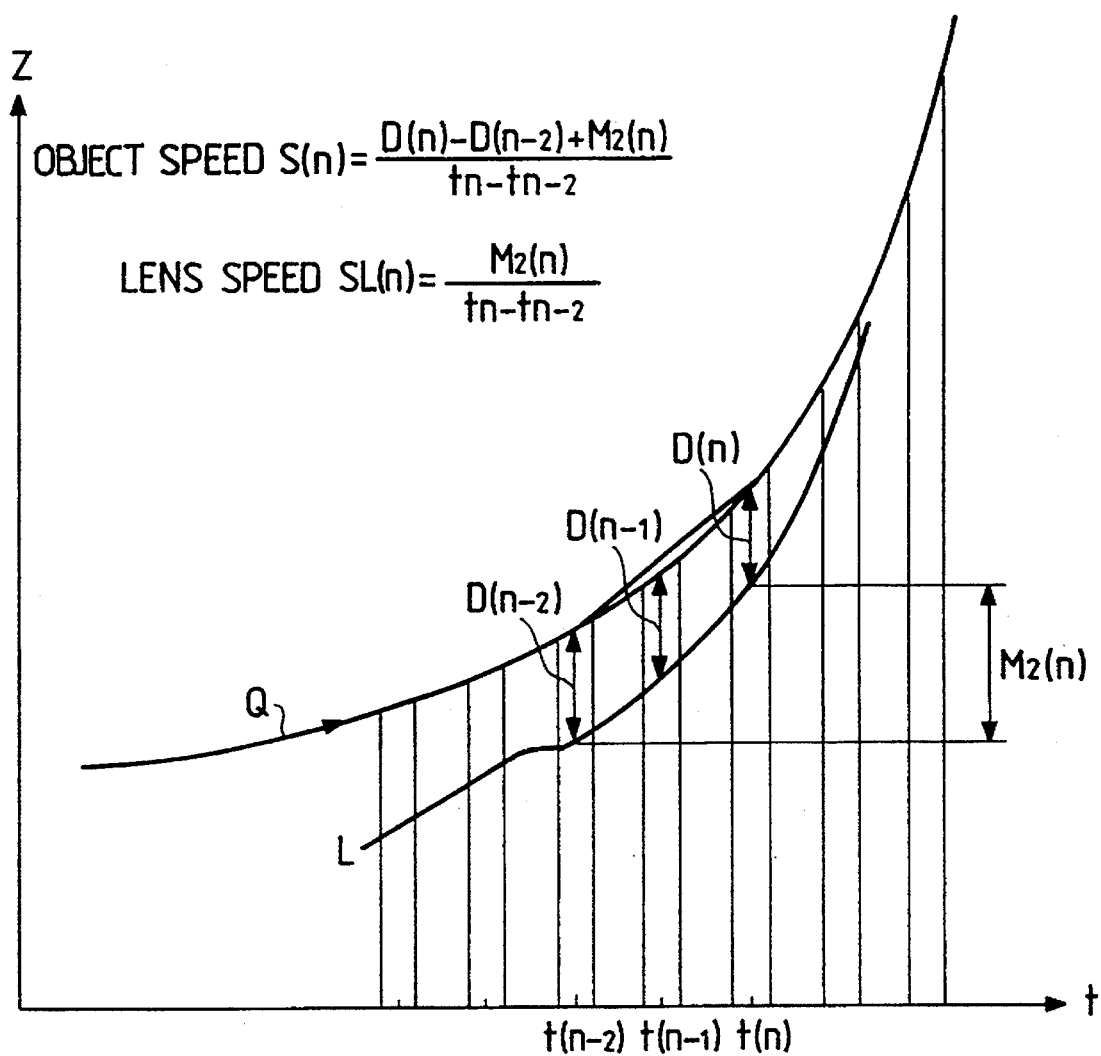
FIG. 5 illustrates a tracking drive method of the photographing lens to the moving object.

In the Japanese Patent Application No. 2-256677 described above, the object image plane velocity is not calculated from the two continuous measurements as in the formula (2) but it is calculated from the measurement data separated by more than two periods in order to improve the detection precision of the object image plane velocity. In this case, the formula (2) is slightly modified. For example, where the object image plane is calculated in two periods, $$P(n)=D(n)+M_2(n)-D(n-2) \qquad (12)$$

$$S(n)=P(n)/\{t(n)-t(n-2)\} \qquad (13)$$

$$t(n+2)-t(n)=t(n)-t(n-2) \qquad (14)$$

where $M_2(n)$ is a displacement of the photographing lens 1 from $t(n-2)$ to $t(n)$. By putting the formulas (12), (13) and (14) in the formula (9), $$V(n)=2D(n)-D(n-2)+M_2(n)-E(n) \qquad (15)$$

is given. FIG. 5 shows an object image plane velocity calculated in two measurement periods. The same is applied when the object image plane velocity is calculated from the measurement data separated by three or more periods.

In the above discussion, it is an aim that the in-focus status is attained at the anticipated measurement time. However, as described in the Japanese Patent Application No. 2-256677, a time period of approximately 60–100 ms is required for the drive-up of a mirror and the control of an iris after the camera shutter has been released and before the film is actually exposed to the light. Since the object moves during the release delay period, it is necessary to drive the photographing lens 1 for the displacement of the object during this period. Further, since the lens drive takes a time determined by the drive distance, the drive must be completed before the start of the light exposure. Accordingly, it is preferable that the lens drive distance after the release is small. Thus, the lens drive distance after the release is added and the lens drive target after the measurement is set ahead of the predicted object position at the next measurement time. As a result, the photographing lens 1 is driven for the lens drive distance including one after the release and it is servoed to pass the object. Specifically, a correction $S$ for the lens drive amount after the release is added to the formula (9) to get $$V(n)=D(n)+\{t(n+2)-t(n)\}\times S(n)-E(n)+\delta \qquad (16)$$

The correction $\delta$ is given by $$\delta=td\times S(n) \qquad (17)$$

where td is a time delay from the start of the release to the start of the light exposure.

The above drive method means that the lens is driven in anticipation of the object displacement after the release at the time of the servo refresh. However, when the object image plane velocity $S(n)$ is high or the delay time td of the camera is long, the correction δ is large and the image on a finder becomes defocused. Accordingly, it may be overcorrection if the amount calculated by the formula (17) is used as the correction δ. Accordingly, an appropriate portion of the amount calculated by the formula (17) is actually used as the correction δ. Namely, $$\delta = \eta \times td \times S(n) \tag{18}$$

where $0 < \eta < 1$

By putting the formula (18) in the formula (16), $$V(n) = D(n) + \{t(n+2) - t(n) + \eta \times td\} \times S(n) - E(n) \tag{19}$$

is got.

Figure 6:
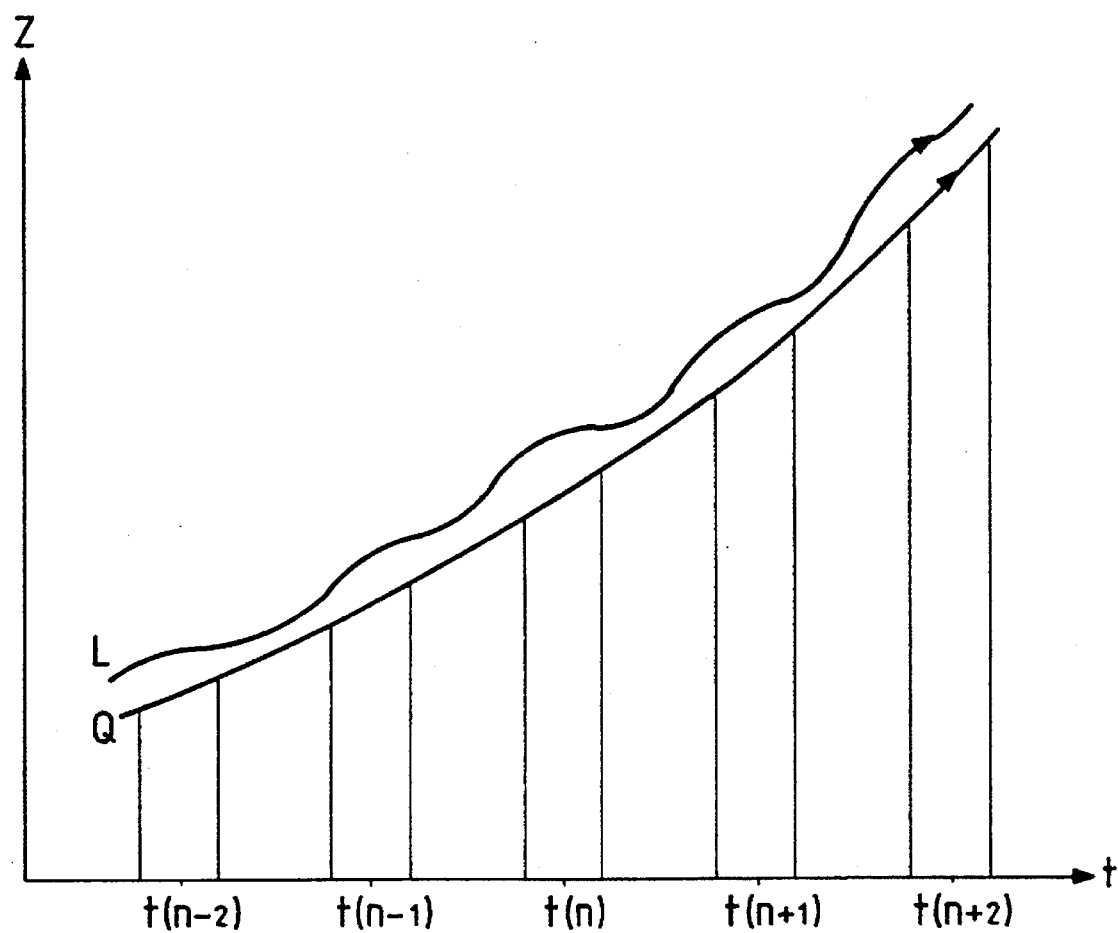
FIG. 6 illustrates a manner of tracking drive of the photographing lens in an embodiment.

By servoing the photographing lens 1 such that the photographing lens 1 is always ahead of the object, the drive distance after the release can be reduced, and the photographing lens 1 may be focused to the object moving at a higher speed, at the exposure time after the release than the photographing lens 1 without the correction. In FIG. 6, the correction δ to the drive amount during the release delay time is added to drive the photographing lens 1. The lens 1 is driven to pass the object in average.

Figure 7:
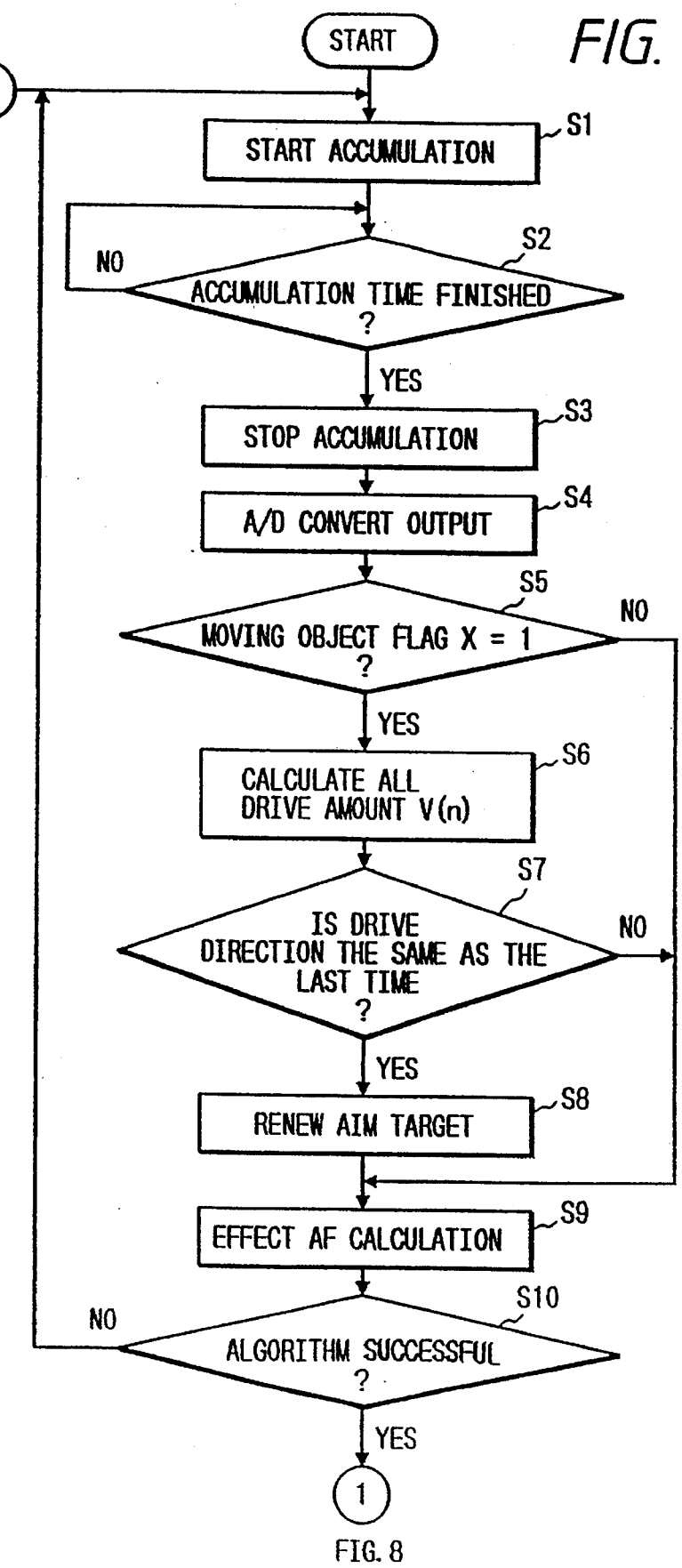
FIG. 7 shows a flow chart of a control program for the tracking drive of the photographing lens to the moving object.
Figure 8:
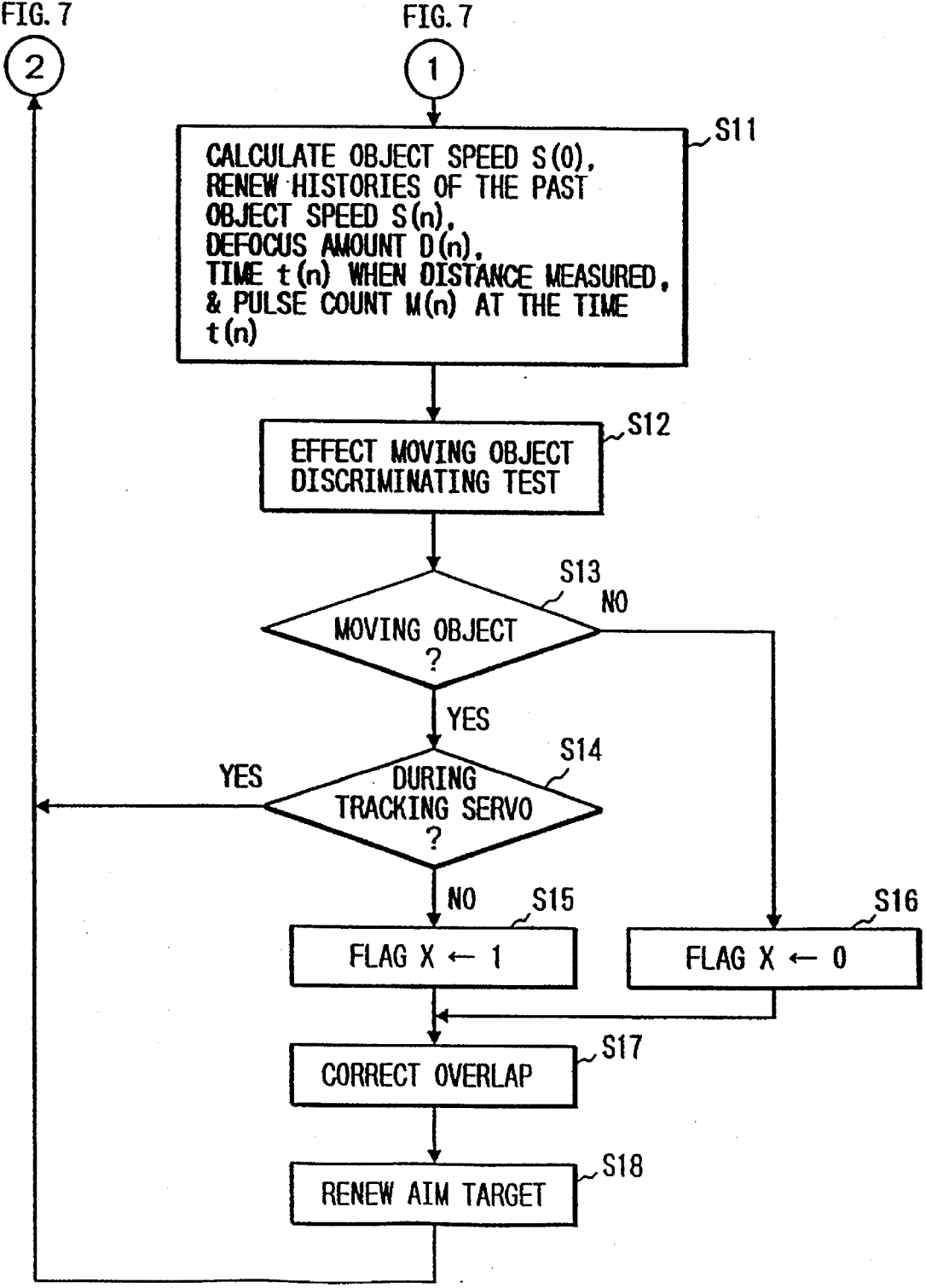
FIG. 8 shows a flow chart of a control program of the tracking drive of the photographing lens to the moving object.

FIGS. 7 and 8 show flow charts of the focusing control executed by the CPU 4. An operation of the embodiment is now explained with reference to those flow charts.

In a step S1, the accumulation of charge by the AF sensor 2 is started. In a step S2, the end of the accumulation time of the AF sensor 2 is checked based on an output level of a monitoring photo-sensor (not shown). The higher the brightness of the object is, the shorter is the charge accumulation time. When the end of the accumulation is detected, the accumulation by the AF sensor 2 is terminated in a step S3. In the following step S4, the focus detection signal outputted by the AF sensor 2 is A/D converted, and in a step S5, whether a flag X which indicates that the tracking servo is in progress is "1" or not is determined. If the flag X is "1", the process proceeds to a step S6, and otherwise it proceeds to a step S9. The status of the flag X is set based on a result of a moving object test to be described later and the flag X is set to "1" if the tracking servo is in progress even if the lens is not actually driven.

In the step S6, the total drive amount V(n) is calculated by, for example, the formula (9). In a step S7, whether the direction of drive of the photographing lens 1 is same as the previous one or not is determined. If it is the same direction, the process proceeds to a step S8, and otherwise it proceeds to a step S9. In the step S8, the lens drive amount is updated by the total drive amount V(n) calculated in the above step to start the servo. If the previous servo is not yet completed, it is continued, and if it is completed, the lens is driven again in accordance with the updated drive amount V(n). If the drive direction of the photographing lens 1 is opposite in the step S7, it means that the photographing lens 1 has passed the anticipated object position. The reversal of the drive direction is not made as described above but the previous servo target is kept unupdated. If the tracking servo is not in progress in the step S5, the updating of the servo target in the step S8 is also skipped.

In the step S9, the AF calculation is effected. In the AF calculation, the defocus amount is calculated by applying an appropriate algorithm to the A/D converted data of the output of the AF sensor 2 stored in a memory. Even during the calculation, the lens is driven in parallel. In a step S10, whether the algorithm has succeeded or not is checked. If it has succeeded, the process proceeds to a step S11 of FIG. 8 and otherwise it returns to a step S1. The algorithm fails when the object has a low contrast or the output level of the AF sensor 2 is inappropriate. If the algorithm succeeds, the calculated defocus amount D(0) is stored and the latest object image plane velocity S(0) is calculated in a step S11 of FIG. 8, and the measurement data of several past generations comprising sets of defocus amount, measurement time and pulse count (lens position) at the time of measurement are updated for the next object image plane velocity calculation. Specifically, the data of the oldest generation in the memory area is discarded and a new set of data is stored. In this manner, the memory area of the CPU 4 may be reduced. The number of generations to be stored depends on the maximum number of generations for the measurement data in calculating the object image plane velocity, as disclosed in the Japanese Laid-Open Patent Application No. 2-146010. In a step S11, the history of the object image plane velocity S(n) is also updated.

Figure 9:
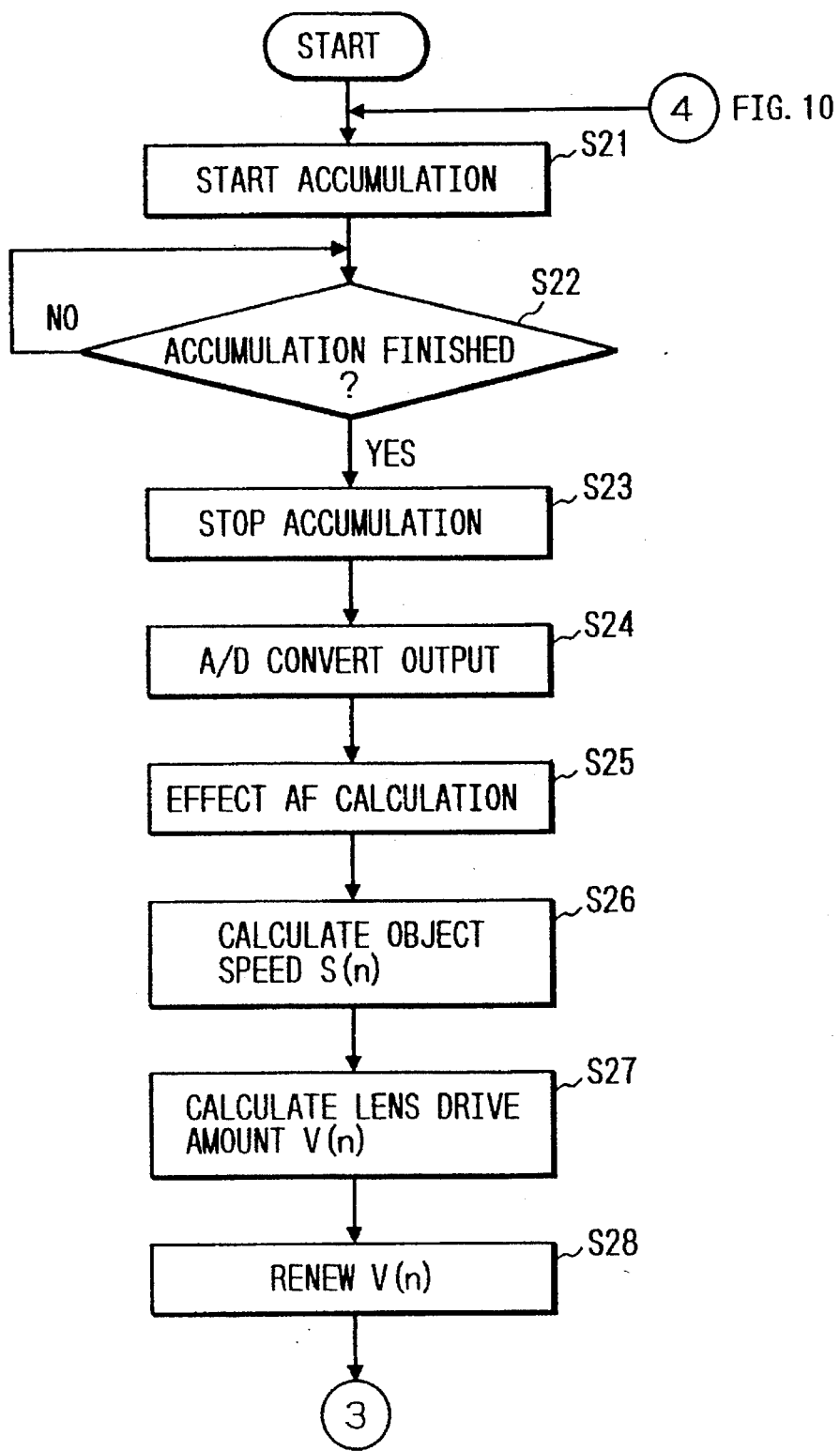
FIG. 9 shows a flow chart of a moving object discrimination program.
Figure 10:
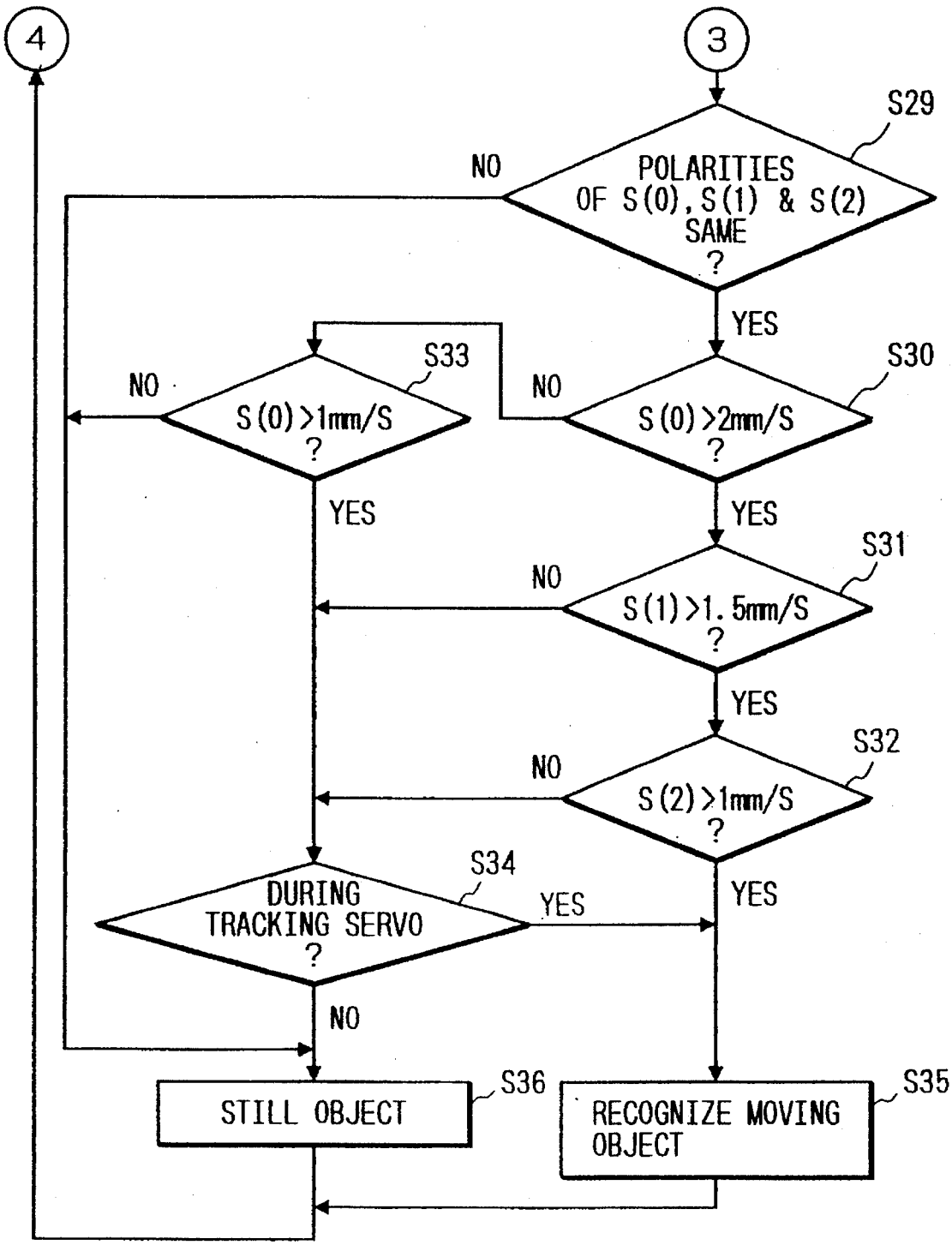
FIG. 10 shows a flow chart of a moving object discrimination program.

In a step S12, a sub-routine of the moving object discrimination test shown in FIGS. 9 and 10 to be described later is executed. In a step S13, whether the object is moving or not is determined, and if it is moving, the process proceeds to a step S14 and otherwise it proceeds to a step S16. In the Step S14, whether the tracking servo is in progress or not is determined, and if it is in progress, the process returns to the step S1 of FIG. 7, and if it is not in progress, the process proceeds to a step S15. If the tracking servo is in progress, the servo target is updated in the step S8 as described above. 10 In order to improve the response, the servo target is calculated for a stationary object when the tracking servo is first initiated and the process proceeds to a step S15 to conduct the same servo as the ordinal overlapped servo. In the step S15, the flag X is set, and in a step S16, the flag X is reset. In a step S17, the lens displacement from the measurement time to the end time of the defocus amount calculation is subtracted from the defocus amount for the correction. Specifically, the total drive distance V(n) is calculated by setting the object image plane velocity to zero in the formula (9).

$$V(n) = D(n) - E(n) \tag{20}$$

In a step S18, the servo target is updated by the calculated total drive distance V(n) and the process returns to the step S1 of FIG. 7.

The moving object discrimination disclosed in the Japanese Patent Application No. 2-256677 mentioned above is now explained with reference to FIGS. 9 and 10.

Steps S21–S24 are the same as the steps S1–S4 of FIG. 7 and the explanation thereof is omitted. In a step S25, the defocus amount is calculated by the AF algorithm. In the following step S26, the object image plane velocity S(n) is calculated by the formula (13). In a step S27, the lens drive distance V(n) is calculated by the formula (4). In a step S28, the drive distance V(n) is updated. In a step S29 of FIG. 10, whether the polarities of the object image plane velocities at the three consecutive measurements are the same or not, that is, whether the movement of the object toward or away from the photographing lens 1 is stable or not is determined. If all are equal, a stationary object is determined in a step S36. In this manner, the unidirectional movement of the object is detected.

In steps S30, S31 and S32, the object image plane velocities S(n) calculated at the predetermined time interval are compared with respective thresholds. Namely, S(0)>2 mm/sec is checked in the step S30, S(1)>1.5 mm/sec is checked in the step S31, and S(2)>1 mm/sec is checked in the step S32. In the step S30, the moving object is not determined unless the object image plane velocity exceeds 2 mm/sec at least once. If the history of the past velocities shows some acceleration in the following steps S30–S32, the moving object is determined in a step S35.

When the tracking servo is initiated from the non-tracking state by detecting the moving object, it can return to the normal servo state when S(0)≦1 mm/sec is detected in the step S33. Namely, once the tracking mode is started, it is hardly terminated. In the present embodiment, once the tracking servo is initiated for the object having the velocity of higher than 2 mm/sec at least once is maintained unless the velocity goes down to 1 mm/sec. If the velocity detected during the tracking is 1 mm/sec≦S(0)<2 mm/sec, the decision in the step S34 is affirmative if the tracking servo has been initiated previously by detecting the moving object in the step S35, and the tracking servo is continued. If the decision in the step S34 is that the tracking servo is not in progress, a stationary object is determined in a step S36.

In this manner, the total drive amount to make the photographing lens in focus is calculated at the time t(n+2) based on the defocus amount measured at the time t(n) and the object image plane velocity, and the servo is refreshed by the total drive distance at the next measurement time t(n+1). Thus, the photographing lens can stably follow the moving object and the tracking ability is improved. Further, since the total drive distance is calculated while taking the lens displacement during the release delay time into account, the corrective drive distance after the release is reduced and the photographing lens can be focused to the object which is moving at a higher speed than the speed permitted in the prior art.

In the present embodiment, the AF sensor 2 corresponds to the charge accumulation type photo-electric conversion means, the microcomputer 4 corresponds to the defocus amount calculation means, the drive distance calculation means, the first and second drive distance calculation means, the control means and the displacement accumulation means, the encoder 6 corresponds to the lens displacement detection means, and the driver 5 and the motor 7 correspond to the drive means.

What is claimed is:

1. An auto-focusing device comprising:

a light receiving device which receives a flux of object light through a photographing lens, accumulates charges during a time interval according to the object light flux, and outputs an electric signal;

defocus amount calculating circuitry which, based on charges accumulated during said time interval, calculates a defocus amount indicative of an amount of defocus of said photographing lens;

a movement amount detecting portion which outputs a lens movement amount indicative of actual movement of said photographing lens;

accumulation circuitry which accumulates the lens movement amount output from the movement amount detecting portion, with no refreshing;

detection circuitry that detects changes in accumulated lens movement amount over successive predetermined time periods;

first movement amount calculation circuitry which, based on the calculated defocus amount and a change in the accumulated lens movement amount during a corresponding one of said tame periods, detects movement of the object and calculates an anticipated amount of movement of the object;

second movement amount calculation circuitry which, based on the anticipated amount of movement of the object and a lens movement amount subsequent to said time interval, calculates a lens drive amount corresponding to a target position for said photographing lens; and a lens drive that drives said photographing lens based on an output from said second movement amount calculation circuitry.

2. An auto-focusing device according to claim 1, wherein said movement amount detecting portion includes an encoder for generating a pulse for each predetermined amount of movement of the photographing lens, said accumulation circuitry includes a counter for counting pulses supplied from said movement amount detecting portion to accumulate the amount of movement of the photographing lens, and said second movement amount calculation circuitry converts the calculated lens drive amount to a number of pulses and adds the converted pulses to the pulse count counted by said counter to calculate the target position.

3. An auto-focusing device according to claim 1, wherein said lens drive does not drive said photographing lens in accordance with a current target position when a direction of lens drive necessary to reach the current target position is different from a direction of lens drive necessary to reach an immediately preceding target position.

4. An auto-focusing device comprising:

a light receiving device which receives a flux of object light through a photographing lens, accumulates charges during a time interval according to the object light flux, and outputs an electric signal;

defocus amount calculating circuitry which, based on charges accumulated during said time interval, calculates a defocus amount indicative of an amount of defocus of said photographing lens;

a movement amount detecting portion which outputs a lens movement amount indicative of actual movement of said photographing lens;

accumulation circuitry which accumulates, relative to a reference position, the lens movement amount output from the movement amount detecting portion, with no refreshing;

first movement amount calculation circuitry which, based on the calculated defocus amount and a prior lens movement amount between two positions other than said reference position, detects movement of the object and calculates an anticipated amount of movement of the object;

second movement amount calculation circuitry which, based on the anticipated amount of movement of the object and a lens movement amount subsequent to said time interval, calculates a lens drive amount corresponding to a target position for said photographing lens; and a lens drive that drives said photographing lens based on an output from said second movement amount calculation circuitry.

5. An auto-focusing device according to claim 4, wherein said movement amount detecting portion includes an encoder for generating a pulse for each predetermined amount of movement of the photographing lens, said accumulation circuitry includes a counter for counting pulses supplied from said movement amount detecting portion to accumulate the amount of movement of the photographing lens, and said second movement amount calculation circuitry converts the calculated lens drive amount to a number of pulses and adds the converted pulses to the pulse count counted by said counter to calculate the target position.

6. An auto-focusing device according to claim 4, wherein said lens drive does not drive said photographing lens in accordance with a current target position when a direction of lens drive necessary to reach the current target position is different from a direction of lens drive necessary to reach an immediately preceding target position.

* * * * *